UNITED STATES PATENT OFFICE 1,940,707

INORGANIC INSULATION FOR ELECTRICAL SHEETS

Vere B. Browne, Brackenridge, Pa.

No Drawing. Application June 2, 1931
Serial No. 541,735

8 Claims. (Cl. 175—21)

This invention relates to inorganic insulation for electrical sheets and to a method of applying such insulation to such sheets. By electrical sheets I mean steel sheets of suitable composition and physical properties adapted for use in electrical apparatus, such as transformers, motors, etc.

In order to cut down inter-sheet eddy losses in electrical apparatus and particularly in transformers, the sheets are usually coated with an organic enamel or varnish and baked. This coating insulates one sheet from another thereby cutting down the eddy losses, the exciting current, the amount of heat due to these losses and the total loss in the transformer. Insulated coatings of this kind, however, will not permit annealing of the sheet after the coating has been applied and is unsatisfactory, therefore, for those purposes where it is desirable to anneal the sheet after it has been insulated.

One of the objects of the present invention is the provision of an inorganic insulation for electrical sheets which obviates the above noted and other disadvantages and which presents additional advantages peculiar to itself.

Another object is to provide electrical sheets with an inorganic insulation which will considerably increase the resistance between sheets and which will permit the insulated sheets to be annealed.

A further object is to provide such a coating which will have excellent electrical resistance and which will protect the sheet from rusting particularly as to sheets previously pickled prior to the application of the insulating coating.

A still further object is to provide an insulated coating on the surfaces of electrical sheets which is of an inorganic nature so that punchings made from these sheets may be subsequently annealed without destroying the insulation.

An additional object resides in the provision of a suitable method for applying the insulation to the sheets.

Other and further objects and advantages will be understood by those skilled in this particular art or will be apparent hereinafter.

I have found that electrical sheets may be insulated with inorganic materials which increase considerably the resistance between sheets and which will permit the sheets to be annealed, if desired, after the coating has been applied without the destruction or burning off of the coating in the anneal.

I have further found that compounds which are suitable for this must have certain properties. For instance, I find that those compounds which are of a gelatinous nature will readily adhere to the sheet, and after being passed through a set of rolls of suitable composition will produce an adherent continuous coating. I have also found that calcium and magnesium silicates and other similar or analogous compounds when properly prepared are suitable compounds for coating electrical sheets and they have sufficient insulation resistance after they have been applied to make them valuable for this purpose.

For example, I find that a calcium silicate which has desirable properties for coating sheets may be prepared by adding water glass to a solution of calcium chloride, the addition of the water glass being continued until all of the calcium is precipitated as calcium silicate. When solutions of the proper concentrations are used the calcium silicate is precipitated as a gelatinous sticky mass. The above precipitation is then thoroughly washed to remove any sodium chloride which may be formed. The washed calcium silicate precipitate is then mixed with water to the proper consistency, the desired thickness of the coating determining the amount of water to be used. For certain purposes small quantities of water glass, or glue or other gelatinous substances may be added to the bath to augment the sticking of the calcium silicate to the sheet.

The sheets to be coated are passed preferably one at a time through this bath and through a set of rolls to distribute the coating evenly over the surfaces of the sheets, after which the sheets pass as by a suitable conveyor through an oven at low temperature to drive off the moisture and thoroughly bake the coating on the surfaces of the sheets.

A coating obtained according to the present invention not only has extremely good electrical resistance but also protects the sheets from rusting, especially in those cases where the scale has previously been removed from the sheet by a suitable pickling operation. Such an insulated coating being of an inorganic nature permits punchings made from these sheets to be subsequently annealed without destroying the insulation.

I have described my invention and the method of applying the same in connection with calcium silicate but it is to be understood that magnesium silicate or other suitable silicates may be utilized in a similar manner. I may also vary the concentrations of the various ingredients depending upon the conditions of the operations and the coating to be obtained.

In the above example, I may use a saturated solution of calcium chloride which is added to a 50% solution of 40° Baumé water glass until precipitation of calcium silicate is complete. After the indicated washing to remove chlorides, the coating is baked for about one minute at about 1200° Fahrenheit, but may be baked at temperatures as low as about 600° Fahrenheit, if the time of exposure is suitably increased. There is, in effect, an inverse relationship existing between time and temperature as will be appreciated from the foregoing.

What I claim as new and desire to secure by Letters Patent is:

1. A coated steel sheet for use in electrical apparatus characterized by having thereon a baked gelatinous adherent coating containing a silicate selected from the group: calcium silicate, magnesium silicate.

2. A coated steel sheet for use in electrical apparatus characterized by having thereon a baked gelatinous adherent coating containing a silicate selected from the group: calcium silicate, magnesium silicate, there being an augmenting gelatinous addition optionally present.

3. An inorganic insulating material for steel sheets for use in electrical apparatus comprising a gelatinous substance capable of adhering to the sheets to form an adherent continuous coating, said gelatinous substance being a suitable silicate selected from the group: calcium silicate, magnesium silicate.

4. An inorganic insulating material for steel sheets for use in electrical apparatus consisting of a gelatinous substance capable of adhering to the sheets to form an adherent continuous coating, said gelatinous substance being a suitable insoluble silicate, small quantities of water glass, glue or other gelatinous substances being optionally present.

5. An inorganic insulating material for steel sheets for use in electrical apparatus comprising a gelatinous substance capable of adhering to the sheets to form an adherent continuous coating, said gelatinous substance being a suitable silicate selected from the group: calcium silicate, magnesium silicate, water insoluble silicate, small quantities of water glass, glue or other gelatinous substances being optionally present.

6. In a method of the character disclosed, forming a gelatinous precipitate of a suitable insoluble silicate, coating steel sheets for use in electrical apparatus with the same, and baking said coating on said sheets for a predetermined time at a predetermined temperature based upon the relationship expressed by about one minute at about 1200° F.

7. The steps in the method of applying inorganic insulation to steel sheets for use in electrical apparatus including preparing a bath of a suitable silicate such as calcium or magnesium silicate, with other gelatinous substances such as glue, or water glass optionally present, passing sheets one at a time through such a bath to coat them, then passing them through a set of rolls to distribute the coating evenly over the surfaces of the sheets, and then passing said coated sheets through an oven for a predetermined time at a predetermined temperature to drive off the moisture and to bake the coating on the surface of the sheet.

8. In a method of the character disclosed, adding a 50% solution of 40° Bé. water glass to a saturated solution of calcium chloride, until calcium silicate is completely precipitated as a gelatinous mass, washing said precipitate, diluting the washed precipitate to desired consistency, passing steel sheets for use in electrical apparatus to be coated one at a time through the latter, then through a set of rolls, and then passing the sheets through an oven at suitable temperature to dry and bake the coating on the sheets.

VERE B. BROWNE.